United States Patent
Park et al.

(10) Patent No.: US 12,388,395 B2
(45) Date of Patent: Aug. 12, 2025

(54) VISCOELASTIC MULTI-LAYERED HIGH-DAMPING YOKE BEAM STRUCTURE FOR SOLAR PANEL

(71) Applicants: LIG NEX1 Co., LTD., Yongin-si (KR); Industry-Academic Cooperation Foundation, Chosun University, Gwangju (KR)

(72) Inventors: Sung Woo Park, Seongnam-si (KR); Soo Jin Kang, Seongnam-si (KR); Jong Pil Kim, Seongnam-si (KR); Hyun Ung Oh, Daejeon (KR)

(73) Assignees: LIG NEX1 Co., LTD., Yongin-si (KR); Industry-Academic Cooperation Foundation, Chosun University, Gwangju (KR)

( * ) Notice: Subject to any disclaimer, the term of this patent is extended or adjusted under 35 U.S.C. 154(b) by 0 days.

(21) Appl. No.: 17/754,201

(22) PCT Filed: Dec. 16, 2021

(86) PCT No.: PCT/KR2021/019229
§ 371 (c)(1),
(2) Date: Mar. 25, 2022

(87) PCT Pub. No.: WO2022/139339
PCT Pub. Date: Jun. 30, 2022

(65) Prior Publication Data
US 2024/0056019 A1    Feb. 15, 2024

(30) Foreign Application Priority Data

Dec. 22, 2020 (KR) .......... 10-2020-0180964
Jul. 21, 2021 (KR) .......... 10-2021-0095797

(51) Int. Cl.
*H02S 30/20* (2014.01)
*B64G 1/10* (2006.01)
(Continued)

(52) U.S. Cl.
CPC ........... *H02S 30/20* (2014.12); *B64G 1/10* (2013.01); *B64G 1/2222* (2023.08); *B64G 1/443* (2013.01); *F16F 15/02* (2013.01); *H02S 10/40* (2014.12)

(58) Field of Classification Search
CPC .......... H02S 30/20; H02S 10/40; F16F 15/02; Y02E 10/47; Y02E 10/50; B64G 1/10; B64G 1/222; B64G 1/44; B64G 1/443
See application file for complete search history.

(56) References Cited

U.S. PATENT DOCUMENTS

| | | | | |
|---|---|---|---|---|
| 5,520,747 A | * | 5/1996 | Marks ............... | B64G 1/443 136/246 |
| 6,175,989 B1 | * | 1/2001 | Carpenter ........... | B64G 1/2229 343/915 |

(Continued)

FOREIGN PATENT DOCUMENTS

| | | | |
|---|---|---|---|
| JP | 63-94831 A | | 4/1988 |
| JP | 10236400 A | * | 9/1998 |

(Continued)

OTHER PUBLICATIONS

Machine translation of JP-10236400-A, Okudaira T. (Year: 1998).*

(Continued)

*Primary Examiner* — Mayla Gonzalez Ramos
(74) *Attorney, Agent, or Firm* — Saliwanchik, Lloyd & Eisenschenk

(57) ABSTRACT

An exemplary embodiment of the present invention provides a deployable solar panel mounted on a movable body configured to be movable, the deployable solar panel includ-
(Continued)

ing: a solar panel mounted on an outer portion of the movable body and configured to convert light energy into electrical energy; and a yoke having a reinforcing part stacked on at least one surface of a base to connect the movable body and the solar panel and configured to attenuate vibration transmitted to the solar panel.

5 Claims, 14 Drawing Sheets

(51) Int. Cl.
*B64G 1/22* (2006.01)
*B64G 1/44* (2006.01)
*F16F 15/02* (2006.01)
*H02S 10/40* (2014.01)

(56) References Cited

U.S. PATENT DOCUMENTS

2011/0192444 A1  8/2011  Beidleman et al.
2018/0142729 A1* 5/2018  Lee ........................... F16F 3/02

FOREIGN PATENT DOCUMENTS

| | | | |
|---|---|---|---|
| JP | 11171099 A | * | 6/1999 |
| JP | 2002357243 A | * | 12/2002 |
| KR | 10-2009-0065151 A | | 6/2009 |
| KR | 10-2010-0078911 A | | 7/2010 |
| KR | 10-2012-0063091 A | | 6/2012 |
| KR | 10-2013-0075937 A | | 7/2013 |
| KR | 10-2018-0056997 A | | 5/2018 |

OTHER PUBLICATIONS

Machine translation of JP-11171099-A, Kawakami K. (Year: 1999).*
Office Action dated Sep. 19, 2023 in Korean Application No. 10-2021-0095797.
International Search Report dated Mar. 30, 2022 in International Application No. PCT/KR2021/019229.

* cited by examiner

FIG. 7D

| Item | Case | Material | | No. of Layers | Thickness (mm) | Yoke Dimension (mm, Excl. Constrained Layer) |
|---|---|---|---|---|---|---|
| Spec. | 1 | Aluminum | | 0 | 1.1 | 249 x 249 x 1.1 |
| | 2 | Superelastic SMA | | | 1.5 | 249 x 249 x 1.5 |
| | 3 | Constrained Layer | FR4 | 2 | 2.1 | |
| | | | | 4 | 2.7 | |
| | | FR4 | Superelastic SMA | 6 | 3.1 | |

| Characteristics | 1st Mode | 2nd Mode |
|---|---|---|
| SMA w/o Layer | 1.234 Hz | 7.957 Hz |
| SMA with 2 Layers | 1.253 Hz | 9.063 Hz |
| SMA with 4 Layers | 1.274 Hz | 10.67 Hz |
| SMA with 6 Layers | 1.282 Hz | 11.45 Hz |

(a)

| Characteristics | 1st Mode | 2nd Mode |
|---|---|---|
| SMA w/o Layer | 0.0032 | 0.0072 |
| SMA with 2 Layers | 0.0079 | 0.0352 |
| SMA with 4 Layers | 0.0086 | 0.0581 |
| SMA with 6 Layers | 0.0105 | 0.0790 |

(b)

VISCOELASTIC MULTI-LAYERED HIGH-DAMPING YOKE BEAM STRUCTURE FOR SOLAR PANEL

CROSS-REFERENCE TO RELATED APPLICATIONS

This application is the U.S. national stage application of International Patent Application No. PCT/KR2021/019229, filed Dec. 16, 2021, which claims the benefit of Korean Application No. 10-2020-0180964, filed Dec. 22, 2020; and 10-2021-0095797 filed Jul. 21, 2021, the disclosures of each of which are incorporated herein by reference in their entirety.

TECHNICAL FIELD

The present invention relates to a yoke and a deployable solar panel using the same, and more particularly, to a viscoelastic yoke and a deployable solar panel using the same.

BACKGROUND ART

The contents disclosed in this section only provide background information in respect to the present embodiment but do not constitute the prior art.

An artificial satellite for observing the earth needs to quickly operate and quickly stabilize the posture thereof on a single orbit in order to maximally acquire various observation results within a limited time. A base needs to be designed to be lightweight and have sufficient rigidity in order to improve maneuverability and stability of the satellite.

A solar panel of the satellite is mounted on an outer portion of a satellite body and has high inertia moment of force. Therefore, the solar panel is one of the factors that significantly affect the posture control. In addition, a deployable solar panel, which is applied to ensure a sufficient electric power area, is folded and accommodated at the time of launching the satellite and then deployed on the orbit after the launch. The deployable solar panel is designed to ensure high strength thereof so that the deployable solar panel withstands launching vibration generated during the launch process and endures deployment impact occurring during the deployment process. For this reason, it is difficult to design a lightweight deployable solar panel. Meanwhile, the recent development on the satellite tends to be focused on reductions in size and weight. However, there is a limitation in that the design technique for ensuring rigidity in the related art causes vibration of a large-sized flexible base.

SUMMARY OF THE INVENTION

The present invention has been made in an effort to apply a layered superelastic shape memory alloy that requires a short deployment stabilization time and efficiently reduce disturbance (vibration and/or impact) applied from the outside without increasing weight and size in all fields that require small-sized/lightweight design.

Other objects, which are not explicitly disclosed in the present invention, may be additionally considered within a range in which the objects can be easily derived from the following detailed description and the effects thereof.

An exemplary embodiment of the present invention provides a deployable solar panel mounted on a movable body configured to be movable, the deployable solar panel including: a solar panel mounted on an outer portion of the movable body and configured to convert light energy into electrical energy; and a yoke having a reinforcing part stacked on at least one surface of a base to connect the movable body and the solar panel and configured to attenuate vibration transmitted to the solar panel.

The yoke may include: the base; and the reinforcing part configured to attenuate vibration inputted from the base and the outside, and the reinforcing part may include: restriction layers stacked on two opposite surfaces of the base; and damping layers having viscoelasticity and configured to bond the restriction layers so that the restriction layers are stacked.

The damping layers and the restriction layers of the reinforcing part may be sequentially and alternately stacked on the two opposite surfaces of the base, and the same number of layers may be alternately stacked on the two opposite surfaces of the base.

Rigidity and damping performance of the yoke may be improved as the number of stacked restriction layers and the number of stacked damping layers are adjusted.

The yoke may be connected to the movable body at a position corresponding to a center of the solar panel, the yoke may be connected to the solar panel at two opposite ends in a width direction of the solar panel, the deployable solar panel may have a vacant space surrounded by the movable body, the yoke, and the solar panel, and the vacant space may have a polygonal shape.

The deployable solar panel may further include: a connection portion configured to connect the yoke and the movable body, and the yoke may be assembled with the solar panel and the connection portion in a screw-fastened manner.

The connection portion may include: a first connection portion fixed to the movable body; and a second connection portion assembled with the first connection portion and connected to the yoke, and the second connection portion may be rotatable in a target direction and rotate the yoke and the solar panel.

The yoke may include: a first yoke fixed to one surface of the connection portion and a first end in the width direction of the solar panel; and a second yoke fixed to a lateral surface facing one surface of the connection portion and a second end formed at a position corresponding to the first end in the width direction of the solar panel, and the first and second yokes may be symmetric with respect to the connection portion and the solar panel.

The base may be made of a superelastic shape memory alloy (SMA).

Another exemplary embodiment of the present invention provides a yoke including: a base; and a reinforcing part stacked on at least one surface of the base and configured to attenuate vibration inputted from the outside, in which the reinforcing part includes: restriction layers stacked on the base; and damping layers having viscoelasticity and configured to bond the restriction layers so that the restriction layers are stacked.

The damping layers and the restriction layers of the reinforcing part may be sequentially and alternately stacked on the two opposite surfaces of the base, and the same number of layers may be alternately stacked on the two opposite surfaces of the base.

The yoke may further include a connection portion configured to connect a movable body configured to be movable and a solar panel, the yoke may be fixed to the movable body by means of the connection portion, and the yoke may be assembled with the solar panel and the connection portion in a screw-fastened manner.

The yoke may include: a first yoke fixed to one surface of the connection portion and a first end in the width direction of the solar panel; and a second yoke fixed to a lateral surface facing one surface of the connection portion and a second end formed at a position corresponding to the first end in the width direction of the solar panel, and the first and second yokes may be symmetric with respect to the connection portion and the solar panel.

Still another exemplary embodiment of the present invention provides an artificial satellite including: a satellite body; a first deployable solar panel connected to one side of the satellite body and including a first solar panel configured to convert light energy into electrical energy, and a first yoke having a first reinforcing part stacked on at least one surface of a first base to connect the first solar panel and the satellite body and configured to attenuate vibration transmitted to the first solar panel; and a second deployable solar panel connected to the other side opposite to the side of the satellite body to which the first deployable solar panel is connected and including a second solar panel configured to convert light energy into electrical energy, and a second yoke having a second reinforcing part stacked on at least one surface of a second base to connect the second solar panel and the satellite body and configured to attenuate vibration transmitted to the second solar panel.

Restriction layers and first damping layers having viscoelasticity may be sequentially and alternately stacked on two opposite surfaces of the first base of the first yoke, and restriction layers and second damping layers having viscoelasticity may be sequentially and alternately stacked on two opposite surfaces of the second base of the second yoke.

According to the embodiment of the present invention described above, the advantage of the present invention is that the lightweight solar panel may be designed by minimizing the necessary rigidity of the solar panel, thereby coping with the tendency of the development on the artificial satellite having the lightweight/small-sized high-damping yoke for the solar panel.

Potential effects, which may be expected by the technical features of the present invention, are treated as being described in the specification of the present invention even though the effects are not explicitly mentioned herein.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
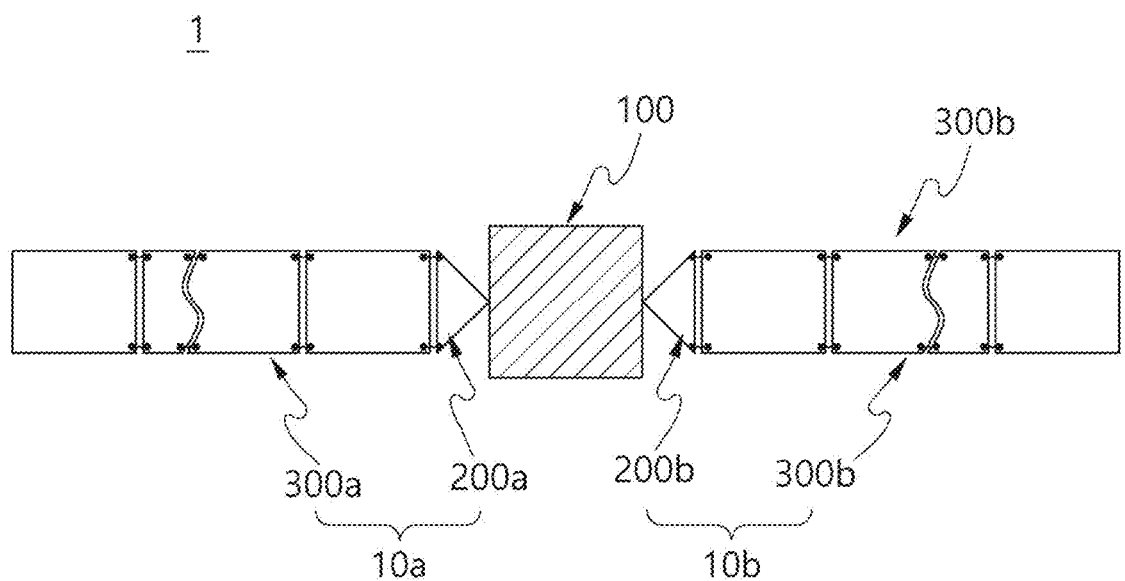
FIGS. 1 to 3 are views illustrating a deployable solar panel using a viscoelastic yoke according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an embodiment of the present invention will be described with reference to the accompanying drawings. Advantages and features of the present invention and methods of achieving the advantages and features will be clear with reference to exemplary embodiments described in detail below together with the accompanying drawings. However, the present invention is not limited to the exemplary embodiments disclosed herein but will be implemented in various forms. The exemplary embodiments of the present invention are provided so that the present invention is completely disclosed, and a person with ordinary skill in the art can fully understand the scope of the present invention. The present invention will be defined only by the scope of the appended claims. Throughout the specification, the same reference numerals denote the same constituent elements.

Unless otherwise defined, all terms (including technical and scientific terms) used in the present specification may be used as the meaning which may be commonly understood by the person with ordinary skill in the art, to which the present invention belongs. In addition, terms defined in a generally used dictionary shall not be construed in ideal or excessively formal meanings unless they are clearly and specially defined in the present specification.

The terms used herein is used for the purpose of describing particular embodiments only and is not intended to limit the present invention. Singular expressions include plural expressions unless clearly described as different meanings in the context. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

The terms including ordinal numbers such as 'second', 'first', and the like may be used to describe various constituent elements, but the constituent elements are not limited by the terms. These terms are used only to distinguish one constituent element from another constituent element. For example, a second component may be named a first component, and similarly, the first component may also be named the second component, without departing from the scope of the present invention. The term "and/or" includes any and all combinations of a plurality of the related and listed items.

The present invention relates to a viscoelastic yoke and a deployable solar panel using the same.

An artificial satellite for observing the earth needs to quickly operate and quickly stabilize the posture thereof on a single orbit in order to maximally acquire various observation results within a limited time. A base needs to be designed to be lightweight and have sufficient rigidity in order to improve maneuverability and stability of the satellite. A solar panel of the satellite is mounted on an outer portion of a satellite body and has high inertia moment of force. Therefore, the solar panel is one of the factors that significantly affect the posture control. In addition, a deployable solar panel, which is applied to ensure a sufficient electric power area, is folded and accommodated at the time of launching the satellite and then deployed on the orbit after the launch. The deployable solar panel is designed to ensure high strength thereof so that the deployable solar panel withstands launching vibration generated during the launch process and endures deployment impact occurring during the deployment process. For this reason, it is difficult to design a lightweight deployable solar panel. Meanwhile, to ensure sufficient electric power to cope with the advancement of satellite task, the size of the solar panel tends to increase. To apply the solar panel to a high-maneuverability satellite, there is a need to design a new structure capable of effectively attenuating vibration occurring on a large-sized flexible base instead of performing design to ensure stability by ensuring rigidity in the related art.

Among structures of the solar panels for general satellites in the related art, a deployable-fixable solar panel is widely applied to optical satellites that require high-maneuverability. This is because the deployed solar panel and a satellite body are fixed by means of a support beam, a hinge having high rigidity is used to connect the panel, and design is performed to increase deployment rigidity, such that a posture stabilization time for capturing images is short. In addition, because the design of the solar panel depends on the application of the support beam and the increase in rigidity of the structure to satisfy minimum necessary rigidity of the satellite, there is a limitation in reducing the weight of the satellite. In addition, the support beam in the related art cannot be applied to a solar-tracking deployable-rotatable solar panel, and rigid body vibration of the solar panel caused by micro-vibration generated from a solar panel rotation driver causes deterioration in directionality of a high-precision satellite. In addition, in the case of an ultra-small satellite on which a solar panel having a comparatively larger size than a main body, is mounted to meet the electric power requirement, the above-mentioned problem becomes more serious.

Therefore, to solve the above-mentioned problem, a deployable solar panel 10 may be designed to be small-sized and lightweight by means of vibration insulation by applying a high-rigidity high-damping yoke 200, and the deployable solar panel 10 may be developed at low cost by mitigating a vibration condition.

Because the deployable solar panel 10 has high rigidity and requires a short stabilization time, the deployable solar panel 10 may be applied to a deployable mechanism part such as a solar panel or an antenna of a high-speed maneuverable reconnaissance satellite and have an advantage in that a larger number of images may be captured under the same condition by virtue of a short stabilization time.

It is possible to design the lightweight deployable solar panel 10 by minimizing necessary rigidity of the solar panel to cope with the tendency of the development on the artificial satellite having the lightweight/small-sized of the high-damping yoke for the solar panel.

The deployable solar panel 10 uses a mechanical technology using vibration reducing properties and may be widely used for all fields including defense industries and civilian industries in respect to aerospace and ground platform technologies as well as the universe field. In particular, the deployable solar panel 10 may be used for a deployment driving unit that has high structural rigidity and requires a short deployment stabilization time.

The deployable solar panel 10 may be used to minimize necessary rigidity by efficiently reducing disturbance (vibration and/or impact) applied from the outside without increasing weight and size in all fields that require small-sized/lightweight design.

According to the embodiment of the present invention, the deployable solar panel 10 may be mounted on a movable body 100 that is movable. In this case, the movable body 100 is an object movable in the universe and may be implemented as, but not necessarily limited to, a satellite body.

Figure 2:
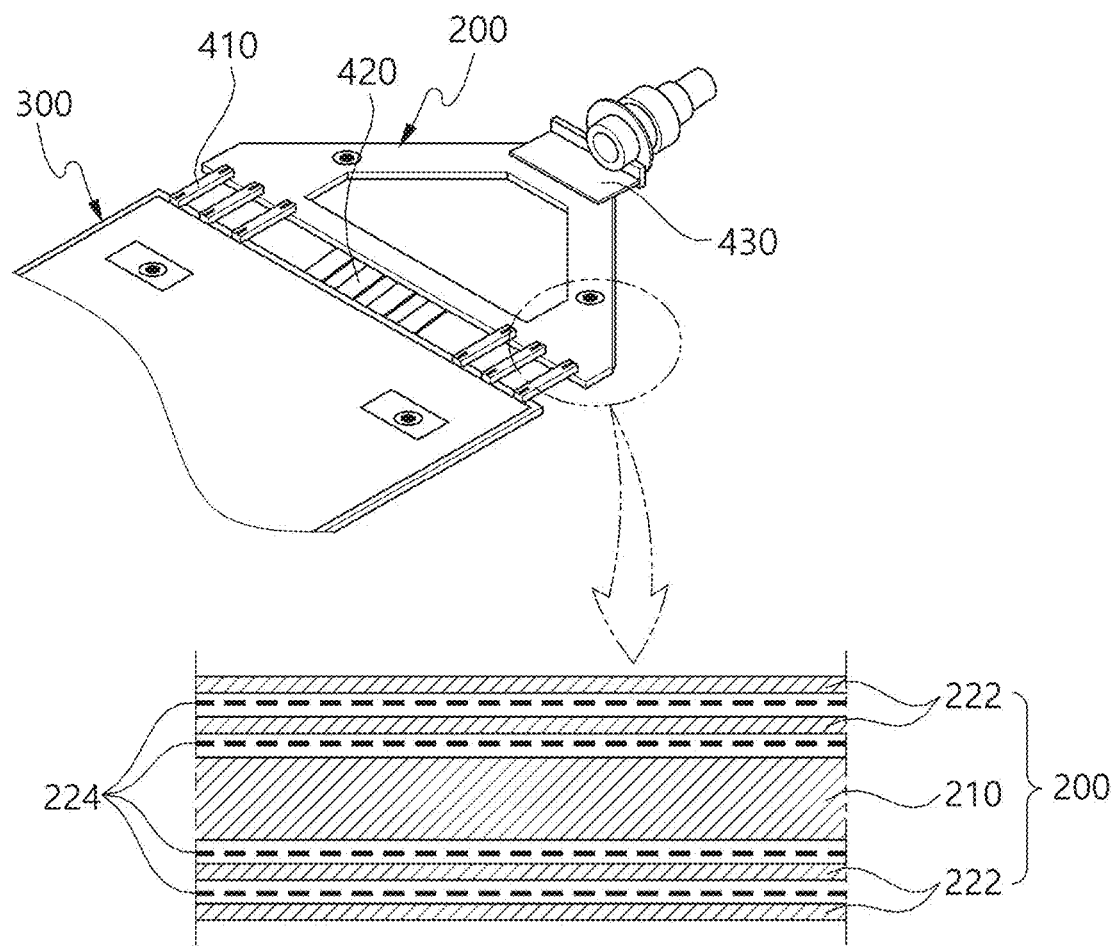
Figure 3:
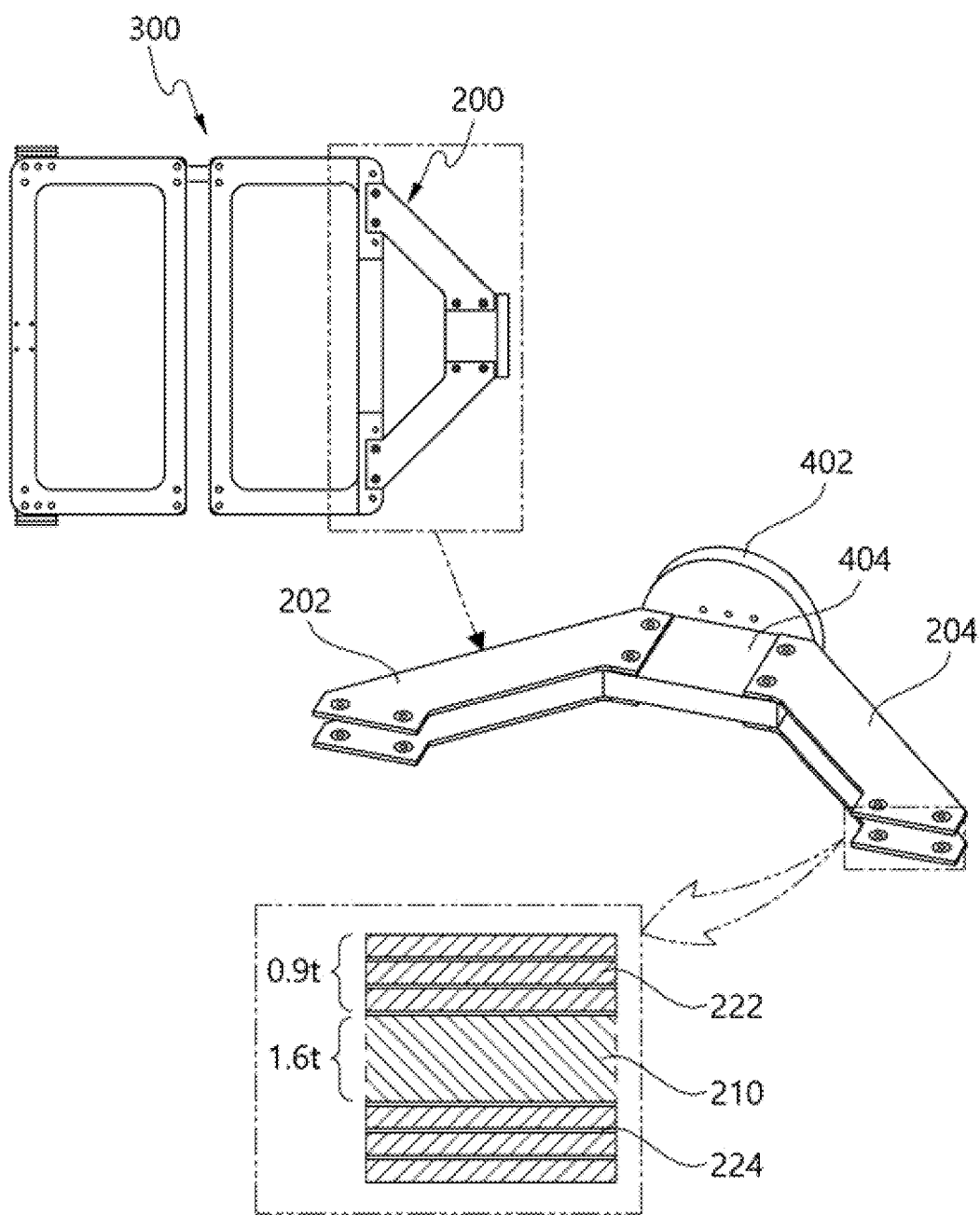

FIGS. 1 to 3 are views schematically illustrating the deployable solar panel using a viscoelastic yoke according to the embodiment of the present invention.

Referring to FIGS. 1 to 3, the deployable solar panel 10 includes a satellite body 100, a yoke 200, and a solar panel 300. In this case, the yoke 200 includes a base 210, and reinforcing parts 220 each including a restriction layer 222 and a damping layer 224. Some components, among various components exemplarily illustrated in FIGS. 1 to 3, may be omitted from the deployable solar panel 10 or the deployable solar panel 10 may further include other components.

FIG. 1 is a view illustrating the deployable solar panel using the viscoelastic yoke according to the embodiment of the present invention, FIG. 2 is a partially enlarged view illustrating the yoke and a first shape in which the solar panel and the yoke having viscoelasticity according to the embodiment of the present invention are assembled, and FIG. 3 is an exemplified partially enlarged view illustrating the yoke and a second shape in which the viscoelastic yoke according to the embodiment of the present invention is assembled.

According to the embodiment of the present invention, the deployable solar panel 10 using the viscoelastic yoke improves damping ability of the yoke 200 which is a structural interface for connecting the solar panel 300 and the satellite body 100, thereby inhibiting damage to the solar panel and deterioration in maneuverability of the satellite caused by environmental vibration inputted from the outside.

Referring to FIG. 1, the artificial satellite 1 may include the satellite body 100, and first and second deployable solar panels 10a and 10b fixed to two opposite sides of the satellite body 100.

The first and second deployable solar panels 10a and 10b are symmetric with respect to the satellite body 100. The first and second deployable solar panels 10a and 10b may have the same shape and be made of the same material.

The first deployable solar panel 10a may include a first solar panel 300a connected to one side of the satellite body 100 and configured to convert light energy into electrical energy, and a first yoke 200a configured to connect the first solar panel 300a and the satellite body 100 and having a first base having at least one surface on which a first reinforcing part is stacked to attenuate vibration transmitted to the first solar panel 300a.

The second deployable solar panel 10b may include a second solar panel 300b connected to the other side of the satellite body 100 opposite to the side connected to the first deployable solar panel 300a and configured to convert light energy into electrical energy, and a second yoke 200b configured to connect the second solar panel 300b and the satellite body 100 and having a second base having at least one surface on which a second reinforcing part is stacked to attenuate vibration transmitted to the second solar panel 300b.

The satellite body 100 may revolve around the planet. Specifically, the satellite body 100 is an artificial device launched to revolve around the planet such as the earth. The satellite body 100 is artificially disposed to revolve around the planet.

The satellite body 100 maintains an appropriate velocity conforming to an altitude, such that the satellite body 100 may remain on the orbit while revolving around the planet without falling onto the ground. The satellite body 100 needs to continuously revolve around the planet without falling onto the ground, departing from the gravisphere of the planet, and bouncing to the universe.

The solar panel 300 may be mounted on an outer portion of the satellite body 100 and convert light energy into electrical energy.

The yoke 200 may connect the satellite body 100 and the solar panel 300.

Referring to FIG. 2, the yoke 200 and the solar panel 300 may be connected to each other by means of battery connection interfaces 410 and 420 or a simple mechanical structure, but the present invention is not limited by the illustrated configuration.

Referring to FIG. 3, the yoke 200 and the solar panel 300 may be connected to each other in a screw-fastened manner without the separate connection interface illustrated in FIG. 2. In this case, at least two holes may be formed in a portion of the yoke 200, which is connected to the solar panel 300, the holes are formed at positions corresponding to positions of holes formed in the solar panel 300, such that the yoke 200 and the solar panel 300 may be fixed in a screw-fastened manner.

The yoke 200 having the high-damping layered structure using a shape memory alloy and a viscoelastic effect has mechanical properties that require a short vibration stabilization time and easily control a deployment mechanism.

According to the embodiment of the present invention, the deployable solar panel 10 using the viscoelastic yoke may apply the superelastic shape memory alloy (SMA), which is better in vibration attenuation performance and elastic properties than general metal, to the physical properties of the base 210 in order to improve damping ability.

According to the embodiment of the present invention, in the deployable solar panel 10, the restriction layers 222 may be stacked on two opposite surfaces of the base 210 by applying the damping layers 224 stacked by a viscoelastic tape to improve the damping ability of the yoke 200. In this case, the base 210 and the restriction layer 222 may be made of the same material. However, the present invention is not limited thereto, and the base 210 and the restriction layer 222 may be made of different materials.

The yoke 200 may be manufactured by a simple manufacturing process and at a low unit price, and the deployable solar panel 10 may have better vibration reducing performance than a metal reinforcing material in the related art, thereby reducing costs.

The reinforcing part 220 of the yoke 200 may be stacked on the two opposite surfaces of the base 210 for connecting the satellite body 100 and the solar panel 300, thereby attenuating vibration transmitted to the solar panel 300.

The yoke 200 may include the base 210 having the superelastic effect, and the reinforcing parts 220 configured to attenuate vibration inputted from the outside.

The base 210 may connect the satellite body 100 and the solar panel 300. For example, the base 210 may be implemented as a base.

The base 210 may be made of, but not necessarily limited to, a superelastic shape memory alloy (SMA). For example, in the case in which the base 210 is made of the superelastic shape memory alloy (SMA), the base 210 may be made of, but not necessarily limited to, a material containing Ni and Ti at a ratio of 51% to 61%:49% to 39%.

According to the embodiment of the present invention, the base 210 may be made of the alloy having the sufficient rigidity and the superelastic effect, such that even the single base 210 may have an effect of insulation equal to or higher than a critical strain rate.

Because the base 210 generates the damping effect to a large displacement that exceeds critical stress of the SMA, the stack made by stacking the restriction layers 222 made of the SMA by using the viscoelastic tape may be coupled to the two opposite surfaces of the base 210 to damp the micro-vibration equal to or lower than the critical stress. Specifically, in a case in which vibration response in the form of bending behavior occurring when vibration is transmitted to the yoke 200 is a large displacement equal to or higher than the critical stress of the SMA, the damping effect of absorbing vibration is generated while a phase change intended to be restored to an original shape occurs. Further, in a case in which the vibration response is a small displacement equal to or lower than the critical stress, the vibration may be attenuated by friction between the damping layers 224 implemented as the viscoelastic double-sided tapes and the stack of the restriction layers 222 implemented as SMA thin plates. In this case, the viscoelastic tape is made of various viscoelastic materials capable of bonding the restriction layers 222 implemented as the stacked SMA thin plates.

Therefore, in the case of the large displacement, the yoke 200 may implement the damping performance effective for a situation in which energy density decreases as energy is dissipated by the phase change of the base 210 or the layered structure of the viscoelastic tape. In the case of the small displacement, the number of layers of the layered structure is increased one by one, such as one layer or two layers, and the damping layer 224 is increased, such that gradually effective damping performance is implemented, but it may be difficult to implement the damping performance from the base 210. In this case, in the case in which the base 210 of the yoke 200 is made of the shape memory alloy, deformation equal to or higher than the critical stress needs to occur to implement the effective damping performance by the phase change.

The critical stress means a maximum deformation force that an object may withstand without being damaged. The bending behavior may mean a force that acts when a certain force is applied, i.e., a force that acts when vibration is generated.

In addition, the large displacement may mean that a displacement by which an object changes the positions thereof is large, i.e., a case in which the displacement is equal to or higher than the critical stress. The small displacement may mean that a displacement by which the object changes the positions thereof is small, i.e., a case in which the displacement is equal to or lower than the critical stress.

The phase change may mean a state in which a certain substance are in different states depending on temperatures and pressures.

Therefore, when the solar panel 300 and the satellite body 100 are bent by vibration or other external forces, the yoke 200 may absorb the vibration caused by the bending. When the vibration response against the bending exceeds the critical stress, the vibration caused by the bending may be absorbed by energy made by the phase change of the base 210 and energy made by the layered structure of the reinforcing part 220.

The reinforcing part 220 may have an insulation effect implemented by friction between the multiple layers by stacking the damping layers 222 having viscoelasticity, thereby having an insulation function focused on a negligibly small deformation. In this case, the material of each of the restriction layer 222 and the damping layer 224 may be all the materials having functions suitable for purposes thereof, and the thicknesses and the sizes of the restriction layer 222 and the damping layer 224 may be implemented without limitation.

The rigidity and damping ability of the yoke 200 are increased depending on the number of restriction layers 222 and the number of damping layers 224, and the number of layers may be adjusted, as necessary.

According to the embodiment of the present invention, the layered superelastic shape memory alloy (SMA) is applied to the viscoelastic yoke 200, and the base 210, which is made of the SMA having the superelastic effect, and the restriction layer 222, which is made of the same material as the base 210, are stacked by using the damping layer 224 having the viscoelastic effect. In this case, the restriction layer 222 may be implemented as a thin plate stack, and the damping layer 224 may be implemented as a viscoelastic tape.

According to the embodiment of the present invention, the damping effect of the viscoelastic yoke 200, which is implemented by the phase change, may be expected when the large displacement exceeding the critical stress is generated when only the SMA is applied. Therefore, the thin plates made of the SMA may be stacked on the two opposite surfaces of the base 210 of the yoke made of the SMA, by using the viscoelastic tapes, in order to attenuate the micro-vibration equal to or lower than the critical stress. In this case, the thin plate may be the restriction layer 222.

Referring to FIGS. 2 and 3, the reinforcing part 220 includes the restriction layers 222 and the damping layers 224. Some components, among various components exemplarily illustrated in FIGS. 2 and 3, may be omitted from the reinforcing part 220 or the reinforcing part 220 may further include other components.

The reinforcing parts 220 may be stacked on the two opposite surfaces of the base 210 and attenuate the vibration transmitted to the base 210, thereby attenuating the vibration transmitted to the solar panel 300.

The plurality of restriction layers 222 and the plurality of damping layers 224 of the reinforcing part 220 may be stacked, and the damping layers 224 and the restriction layers 222 may be alternately stacked and fixed. Specifically, the damping layers 224 and the restriction layers 222 of the reinforcing parts 220 may be sequentially and alternately stacked on the two opposite surfaces of the base 210 or correspondingly stacked.

The reinforcing part 220 may have the high damping ability implemented by the viscoelasticity and attenuate the vibration in the environment in which the satellite body 100 vibrates, thereby inhibiting damage to the solar panel 300 and deterioration in maneuverability of the satellite body 100.

The reinforcing part 220 may be the structure made of various viscoelastic materials having the damping ability to dissipate the vibration transmitted to the base 210 (to decrease energy density by dissipating energy). In this case, the damping means an ability to attenuate vibration and may reduce the vibration by dissipating the vibrational energy transmitted to the base 210.

To attenuate the micro-vibration equal to or lower than the critical stress, the plurality of restriction layers 222 of the reinforcing part 220 may be alternately stacked and fixed on the two opposite surfaces of the base 210 by using the damping layers 224 that provides viscoelasticity to attenuate the vibration.

According to the embodiment of the present invention, a thickness of the stacked thin plates of the reinforcing part 220 is several millimeters or less, thereby implementing small-sized/lightweight electronic devices mounted on aerospace planes by virtue of advantageous features capable of minimizing increases in weight and volume in comparison with a metallic reinforcing material in the related art. In this case, the stacked thin plates are the restriction layer 222 and the damping layer 224.

According to the embodiment of the present invention, in the yoke 200, the reinforcing parts 220 may be stacked, in a balanced way, on the two opposite surfaces of the base 210. If the number of layers of the reinforcing parts 220, which are stacked on the two opposite surfaces of the base 210, is not balanced, the behavior imbalance of the solar panel 300 may be caused.

The restriction layer 222 may be made of the same material as the base 210. Since the base 210 and the restriction layer 222 are made of the same material, the characteristics of oscillation frequencies transmitted to the base 210 and the restriction layer 222 may be identical to one another, thereby effectively attenuating the vibration. In this case, the base 210 may be manufactured to be lightweight and thin at low cost, and the restriction layer 222, which is made of the same material as the base 210, may also be manufactured to be lightweight and thin at low cost.

According to the embodiment of the present invention, as the number of restriction layers 222 stacked on the base 210 increases, the thickness of the yoke 200 may increase, and the rigidity may also increase. Therefore, even though the number of restriction layers 222 increases, the restriction layer 222 may be applied to the material that may be used to manufacture the plate having a small elastic modulus or a small thickness so that there is no great difference from rigidity of the base 210 in the related art.

According to the embodiment of the present invention, the base 210 and the restriction layer 222 may be implemented as FR-4 made of a material containing fiberglass and epoxy, but the present invention is not necessarily limited thereto.

For example, the restriction layer 222 may have an elastic modulus of 1.5 E+10 Mpa to 2.3 E+10 Mpa. A ratio between horizontal deformation and vertical deformation (Poisson ratio) may be 0.09 to 0.18, and density may be 1500 kg/M$^3$ to 2200 kg/M$^3$. In addition, the thickness of the restriction layer 222 may be 0.2 mm to 0.5 mm. In this case, if the elastic modulus is smaller than the above-mentioned range, there may be a problem in that the strength decreases. If the elastic modulus is larger than the above-mentioned range, there may be a problem in that the restriction layer is hardly deformed and the effect of attenuating the vibration decreases. If the ratio between the horizontal deformation and the vertical deformation (Poisson ratio) is lower than the above-mentioned range, there may be a problem in that the effect of attenuating the vibration may decrease. If the ratio between the horizontal deformation and the vertical deformation (Poisson ratio) is higher than the above-mentioned range, there may be a problem in that the mass increases. In addition, if the density is lower than the above-mentioned range, there may be a problem in that the volume increases. If the density is higher than the above-mentioned range, there may be a problem in that the mass increases.

When the material excellent in damping performance (performance of decreasing energy density by dissipating energy) implemented by the deformation is applied to the restriction layer 222, it is possible to implement high vibration reducing performance.

According to the embodiment of the present invention, the restriction layer 222 may be made of a different material from the base 210, and the sufficient bending behavior of the base 210 may be required to implement the high damping. Therefore, when the restriction layer 222 is made of the high-rigidity material, the effect may significantly decrease.

According to the embodiment of the present invention, the restriction layer 222 may be formed as a maximally thin layer. Specifically, in the reinforcing part 220, the plurality of restriction layers 222, which is formed to be maximally thin, may be bonded by means of the damping layer 224. To stack a large number of restriction layers 222 even though the thickness remains the same, the restriction layer 222 may be formed to be maximally thin, but the present invention is not necessarily limited thereto.

The damping layer 224 may provide viscoelasticity. In this case, the viscoelasticity provides both solid properties and liquid properties when a force is applied to the object.

According to the embodiment of the present invention, the damping layer 224 may be made of a material containing at least one of acrylic, polyurethane, polyimide, and acetate, such that the damping layer 224 may have both viscosity and elasticity.

For example, the damping layer 224 may have an elastic modulus of 420,000 Mpa to 480,000 Mpa, the ratio between the horizontal deformation and the vertical deformation (Poisson ratio) may be 0.3 to 0.7, and the density may be 800 kg/M$^3$ to 1,200 kg/M$^3$. In addition, the damping layer 224 may be 0.02 mm to 0.08 mm. In this case, if the elastic modulus is smaller than the above-mentioned range, there may be a problem in that the strength decreases. If the elastic modulus is larger than the above-mentioned range, there may be a problem in that the restriction layer is hardly deformed and the effect of attenuating the vibration decreases. If the ratio between the horizontal deformation and the vertical deformation (Poisson ratio) is lower than the above-mentioned range, there may be a problem in that the effect of attenuating the vibration may decrease. If the ratio between the horizontal deformation and the vertical deformation (Poisson ratio) is higher than the above-mentioned range, there may be a problem in that the mass increases. In addition, if the density is lower than the above-mentioned range, there may be a problem in that the volume increases. If the density is higher than the above-mentioned range, there may be a problem in that the mass increases.

The damping layer 224 may be implemented as a viscoelastic tape. In this case, the viscoelastic tape may be the damping layer 224. When a force is applied to the object, the viscoelastic tape may provide both liquid properties and solid properties.

The viscoelastic tape is made of various viscoelastic materials capable of bonding the stacked restriction layers 222. Particularly, the viscoelastic tape may be implemented as 3M966 used for various materials that require high bonding force, heat resistance, moisture resistance, and solvent resistance. In this case, in order to the above-mentioned properties, the 3M966 tape is a product that satisfies outgassing properties for space application reference and has space heritage, and the 3M966 tape needs to necessarily satisfy the outgassing criterion so that the 3M966 tape is used for space.

Therefore, in the yokes 200 of the deployable solar panel 10, the plurality of reinforcing parts 220 is stacked and connected to the base 210 by the viscoelastic tape, and the vibration response, which is in the form of the bending behavior by the transmitted vibration, may effectively attenuate the vibration by means of friction between the viscoelastic double-sided tape and the base 210.

It is possible to improve the rigidity and damping performance by adjusting the number of restriction layers 222 and the number of damping layers 224 of the yoke 200.

According to the embodiment of the present invention, the number of restriction layers 222 and the number of damping layers 224 may vary depending on the necessity and the environment in which the deployable solar panel 10 or the yoke 200 is used.

The rigidity and damping ability of the yoke 200 are increased depending on the number of restriction layers 222 and the number of damping layers 224, and the number of restriction layers 222 and the number of damping layers 224 may be adjusted, as necessary.

In a case in which the vibration response in the form of the bending behavior occurring when the vibration is transmitted to the yoke 200 is the large displacement equal to or higher than the critical stress of the base 210, the damping effect of absorbing vibration is generated while the phase change intended to be restored to the original shape occurs. Further, in the case in which the vibration response is the small displacement equal to or lower than the critical stress, the vibration may be attenuated by friction between the damping layer 224, the base 210, and the restriction layer 222, which provides viscoelasticity.

According to the embodiment of the present invention, in the yoke 200 of the deployable solar panel 10, the damping performance of the yoke 200 is improved as the number of layers of the reinforcing part 220 increases, and the number of layers may be adjusted, as necessary.

According to the embodiment of the present invention, the rigidity, the strength, and the damping performance may increase as the thickness of the reinforcing part 220 stacked on the base 210 increases. Because the yoke 200 needs to be deformed by an external force to implement the desired performance, the implemented rigidity, which is higher than necessary, may cause the deterioration in damping performance.

Therefore, the yoke 200 may be manufactured such that the base 210 and the reinforcing part 220 have different thicknesses and different numbers of layers to meet the rigidity requirement required according to the satellite body 100 and the solar panel 300 which are applied to the present invention.

According to the embodiment of the present invention, the shape of the reinforcing part 220 may be implemented, as illustrated in FIG. 3, to mitigate the vibration of the base 210 and minimize the weight and volume by means of the high damping properties implemented by friction.

According to the embodiment of the present invention, in the yoke 200 of the deployable solar panel 10, the base 210 and the restriction layer 222 may be connected and fixed by means of the damping layer 224, but the present invention is not necessarily limited thereto.

Referring to FIG. 2, the yoke 200 may have a polygonal shape and connect the satellite body 100 and the solar panel 300. In this case, the yoke 200 may have an integrated polygonal shape and be connected to the solar panel 300 at a side facing a portion connected to the satellite body 100. In this case, the yoke 200 may be connected to the solar panel 300 by means of the battery connection interfaces 410 and 420 and connected to the satellite body 100 by means of the satellite connection interface 430.

In addition, the deployable solar panel 10 may have a vacant space surrounded by the satellite body 100, the yoke 200, and the solar panel 300. In this case, the vacant space may have a polygonal shape. For example, the vacant space may have a hexagonal shape as illustrated in FIG. 2, and the vacant space may have a quadrangular shape illustrate FIG. 3. In this case, the vacant space may reduce the weight of the yoke 200, require low rigidity, and minimize unnecessary mass.

According to the embodiment of the present invention, two opposite ends in the width direction of the yoke 200 may be connected to the solar panel 300, and one end of the yoke 200 may be connected to the satellite body 100. Since the solar panel 300 is thin and large in area, moment of force may be generated when the solar panel 300 is fixed only at a center or one side. Specifically, in a case in which the yoke 200 is connected to the center of the solar panel 300 and the satellite body 100 or the yoke 200 is only at one end in the width direction of the solar panel 300 so as to be closer to one side and connected to the satellite body 100, there is a problem in that the moment of force in the form of bending is generated when vibration is introduced. To solve the problem, according to the present invention, the yoke 200 may be connected to two opposite surfaces in the width direction of the solar panel 300 and one surface of the satellite body 100. Referring to FIG. 3, the yoke 200 may include a first yoke 202 and a second yoke 204. In this case, the first yoke 202 and the second yoke 204 may be connected to each other by means of a first connection portion 404. Specifically, the first and second yokes 202 and yokes 204 each have a quadrangular shape and are coupled to the first connection portion 404 at one end thereof in a screw-fastening manner. The first and second yokes 202 and yokes 204 may have the same shape. In this case, the first connection portion 404 may be connected to the satellite body 100 by means of a second connection portion 402.

The second connection portion 402 may be connected to one surface of the first connection portion 404, and the portion of the second connection portion 402, which is connected to the satellite body 100, may vary depending on the shape of the satellite body 100.

According to the embodiment of the present invention, the first and second yokes 202 and 204 may be fixed in a polygonal shape when the first and second yokes 202 and 204 are assembled with the first connection portion 404 and the solar panel 300. For example, the yoke 200 may be positioned between the satellite body 100 and the solar panel 300 and configured such that the first and second yokes 202 and 204 are assembled with the two opposite surfaces around the first connection portion 404 positioned to correspond to a central portion of the solar panel 300. In this case, one side of each of the first and second yokes 202 and 204 may be connected to the first connection portion 404 formed at a position corresponding to the center of the solar panel 300, and the other side of each of the first and second yokes 202 and 204 may be connected to the two opposite ends in the width direction of the solar panel 300.

According to the embodiment of the present invention, the first connection portion 404 may be implemented to be rotatable. Specifically, since the yoke 200 is disposed between the satellite body 100 and the solar panel 300, the yoke 200 may be implemented to be rotatable to rotate the solar panel in a case in which a solar panel, to which rotation driving is applied like a sun-tracking solar panel, is used.

Therefore, the first connection portion 404 may be connected to second connection portion 402 and rotated clockwise or counterclockwise.

A predetermined thickness or more needs to be maintained to maintain minimum rigidity in comparison with an integrated yoke made of a single material in the related art. According to the embodiment of the present invention, since the yoke 200 according to the present invention has the high damping effect and does not high rigidity, the yoke 200 may be used by being assembled to be thin. Further, the yoke 200 may be divided into the first and second yokes 202 and 204 and used, thereby maximizing the damping effect in comparison with the case in which the integrated yoke 200 is used.

Therefore, referring to FIGS. 2 and 3, the yoke 200 may have the structure in which the base 210, the restriction layers 222, and the damping layers 224 are stacked on one another. The yoke 200 may connect the satellite body 100 and the solar panel 300 and define a polygonal shape.

Figure 4:
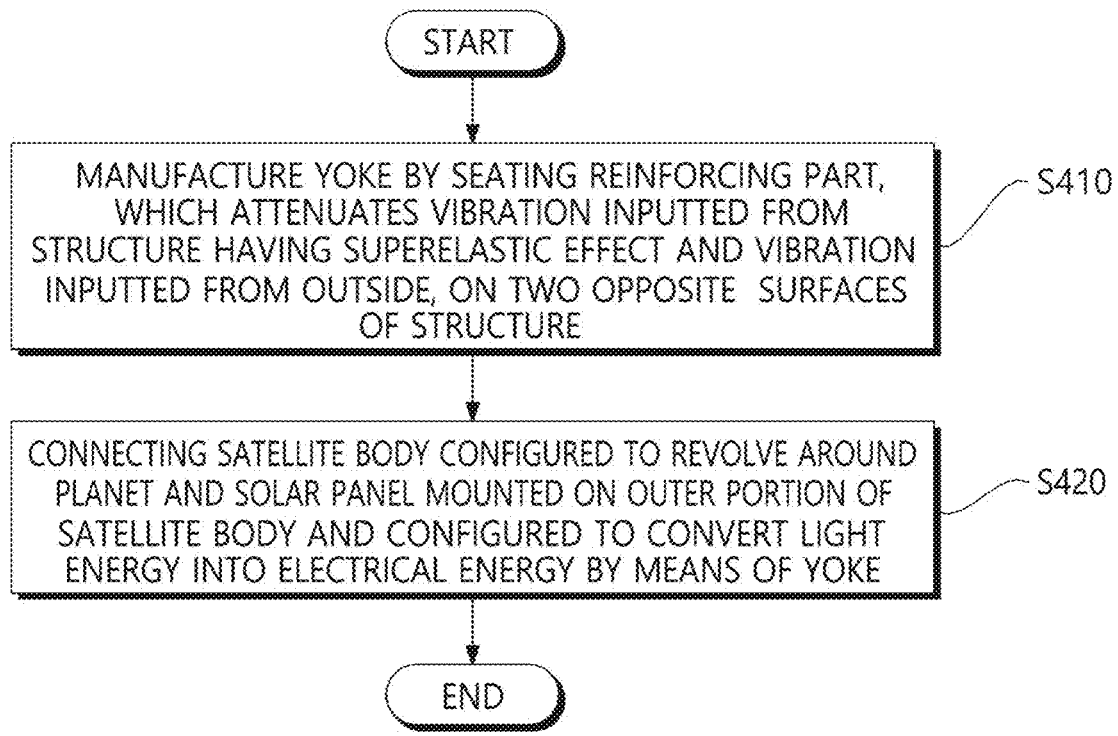
FIG. 4 is a flowchart illustrating a method of manufacturing the deployable solar panel using the viscoelastic yoke according to the embodiment of the present invention.

FIG. 4 is a flowchart illustrating a method of manufacturing the deployable solar panel using the viscoelastic yoke according to the embodiment of the present invention. The method of manufacturing the deployable solar panel is performed to manufacture the deployable solar panel, and a repeated and detailed description of the deployable solar panel will be omitted.

A method of manufacturing a high-damping layered printed circuit board using viscoelasticity includes step S410 of manufacturing the yoke by seating the reinforcing parts, which attenuate vibration inputted from the base having the superelastic effect and vibration inputted from the outside, on the two opposite surfaces of the base; and step S420 of connecting the yoke to the satellite body and the solar panel mounted on an outer portion of the satellite body and configured to convert light energy into electrical energy.

In step S510 of manufacturing the yoke by seating the reinforcing parts, which attenuate the vibration inputted from the base having the superelastic effect and the vibration inputted from the outside, on the two opposite surfaces of the base, the yoke may be manufactured by seating the reinforcing parts on the base, the reinforcing part being made by alternately stacking the restriction layers, which are made of the same material as the base, and the damping layers that provide the viscoelasticity.

FIG. 4 illustrates that the respective steps are sequentially performed, but this illustration is given to exemplarily describe the present invention. However, various modifications and deformations may be made by performing the steps while changing the order illustrated in FIG. 4, performing one or more of the steps in parallel, or adding other steps by those skilled in the art without departing from the intrinsic characteristics of the embodiment of the present invention.

FIGS. 5 to 11 are views illustrating results of experiments on types of yokes for the deployable solar panel according to the embodiment of the present invention.

Figure 5:
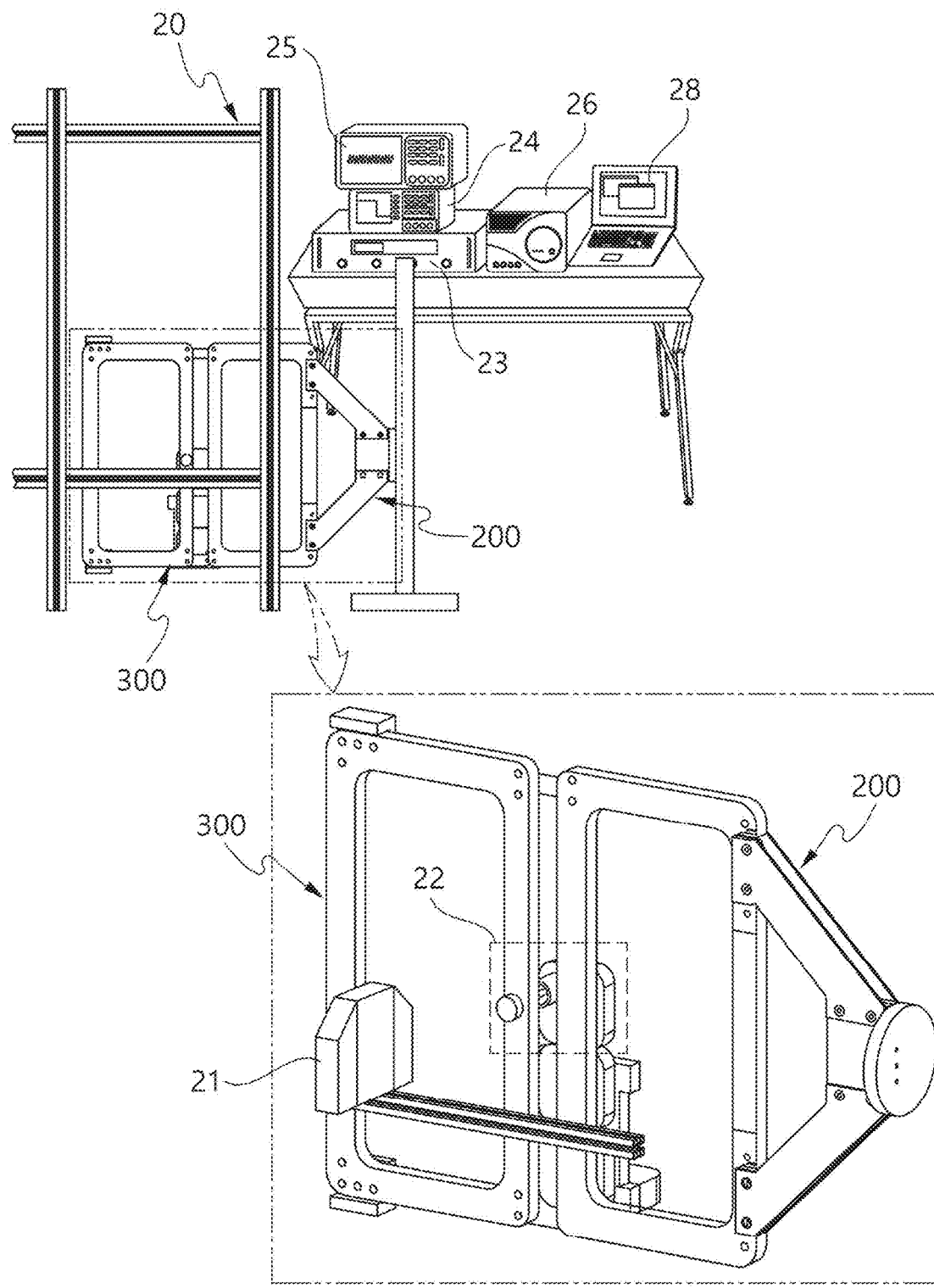
FIGS. 5 to 11 are views illustrating results of experiments on types of yokes for the deployable solar panel according to the embodiment of the present invention.
Figure 6:
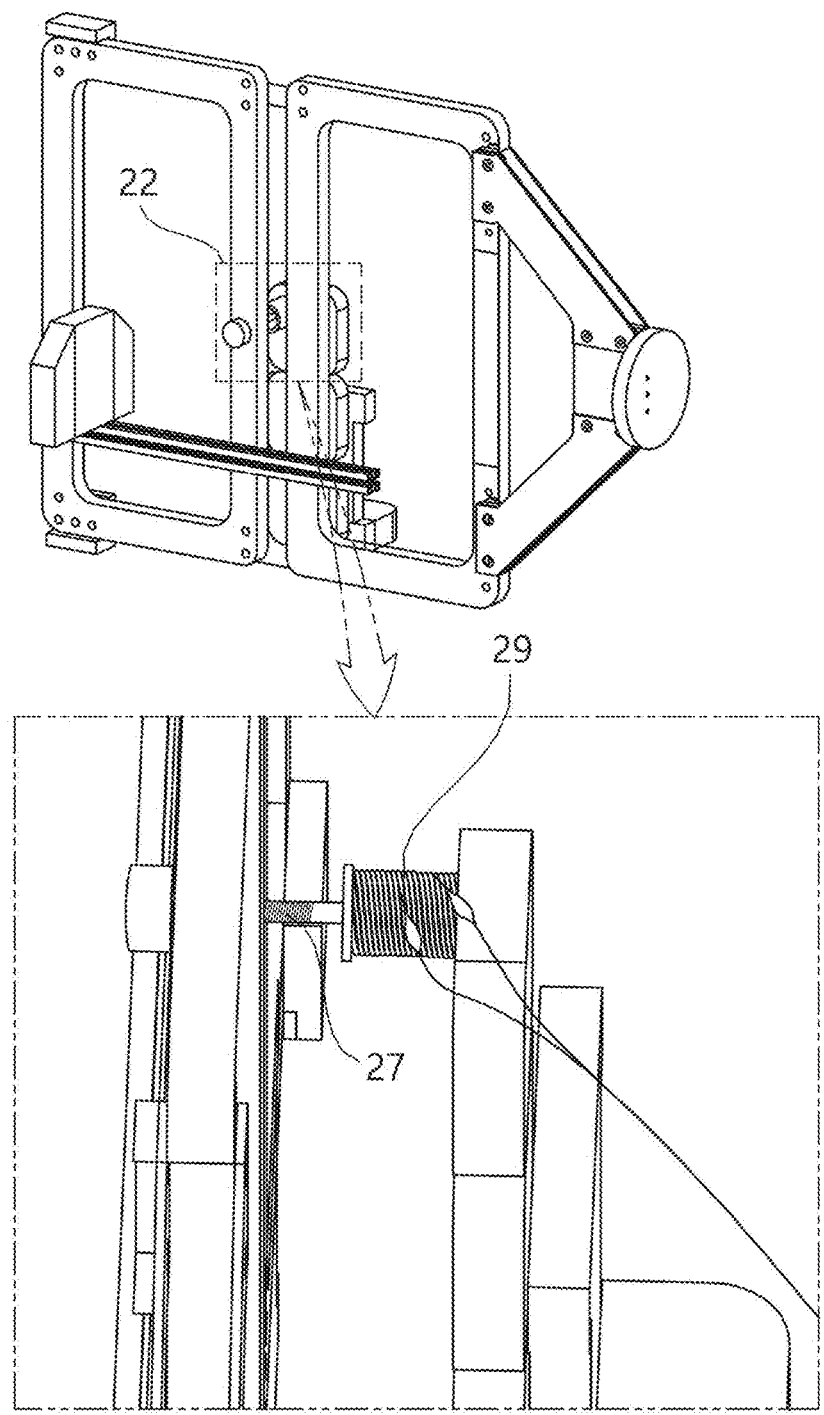

FIG. 5 is a view illustrating an experimental configuration for deriving a result of a second test on the number of layers of the reinforcing part of the viscoelastic yoke according to the embodiment of the present invention, and FIG. 6 is a view illustrating a configuration of a non-contact vibration exciter according to the embodiment of the present invention.

Referring to FIG. 5, the configuration for testing properties of the yoke includes the yoke 200 and the solar panel 300. The configuration for the test includes a gravity compensation device 20, a displacement sensor 21, a non-contact vibration exciter 22, a power amplifier 23, a function generator 24, an oscilloscope 25, a power supplier 26, and a processor 28. Some components, among various components exemplarily illustrated in the drawings, may be omitted from the configuration for testing properties of the yoke or the configuration for testing properties of the yoke may further include other components.

The gravity compensation device (0 g compensation device) 20 is a device for compensating the space gravity, i.e., 0 g and enables experiments to be penetratively formed in the environment such as the space.

The displacement sensor 21 may measure a distance or position by which the object has moved.

The non-contact vibration exciter 22 may produce vibration in a non-contact manner.

The power amplifier 23 may supply power.

The function generator 24 may generate frequencies having any waveform.

The oscilloscope 25 may output a change in input voltage and displays the change in input voltage so that a user may observe the change.

The power supplier 26 may supply voltage and current required to perform the experiment.

The processor 28 may receive the experimental result, provide the experimental result, and provide a result of calculating the experimental result. For example, the processor 28 may be implemented as a PC, but the present invention is not necessarily limited thereto.

Referring to FIG. 6, the non-contact vibration exciter 22 includes a permanent magnet 27 and a solenoid coil 29.

The permanent magnet 27 is a magnet for maintaining high magnetization state for a long period of time.

The solenoid coil 29 is a coil uniformly wound and having elongated cylindrical shape.

FIG. 7 is a view illustrating yokes used for a process of testing properties of the yoke according to the embodiment of the present invention.

Figure 7A:
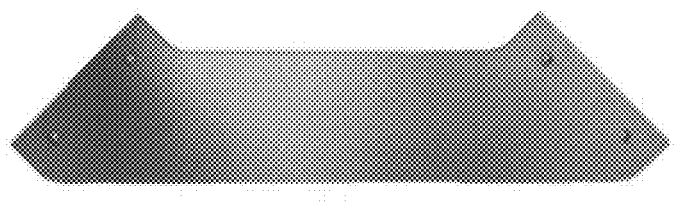
Figure 7B:
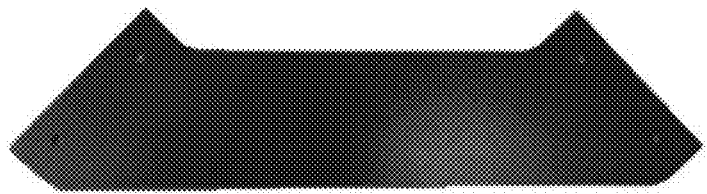
Figure 7C:
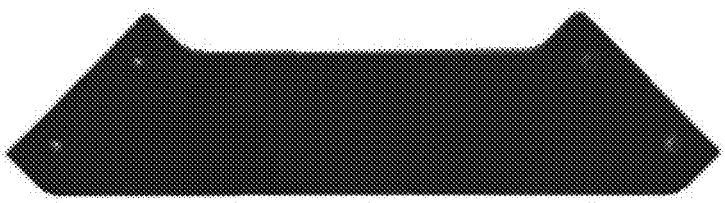

FIG. 7A illustrates the first yoke made of aluminum, FIG. 7B illustrates the yoke made of the SMA, FIG. 7C illustrates the yoke made of the SMA for forming several layers, and FIG. 7D illustrates the specifications of the first yoke, the second yoke, and the third yoke.

The test for the properties of the yoke may be performed for each material of the yoke.

Referring to FIG. 7, the first yoke may be made of aluminum, the second yoke may be made of the SMA having the superelastic effect, and a third yoke may be made of the SMA having the superelastic effect of forming several layers.

Referring to FIG. 7D, the first yoke may be made of aluminum and formed by 0 layer. In addition, the first yoke may have a thickness of 1.1 mm and a dimension of 249×249×1.1 mm. However, this is an example used for the following experiment, and the present invention is not limited thereto.

The second yoke may be made of a superelastic SMA and have a 0 layer. In addition, the second yoke may have a thickness of 1.5 mm and a dimension of 249×249×1.5 mm. However, this is an example used for the following experiment, and the present invention is not limited thereto.

The third yoke may be made of FR-4 containing fiberglass and epoxy and the restriction layer 222 or a superelastic SMA and FR-4 containing fiberglass and epoxy and have 2 layers, 4 layers, or 6 layers. In addition, the second yoke may have thicknesses of 2.1 mm, 2.7 mm, and 3.1 mm for the respective layers and a dimension of 249×249×1.5 mm. However, this is an example used for the following experiment, and the present invention is not limited thereto.

The yoke illustrated in FIG. 7 is an example used for the following test for properties of the yoke, and the present invention is not limited thereto.

The test for properties of the yoke performs a free attenuation test, a sine sweep test, and a temperature test.

FIG. 8 is a view illustrating a result of the free attenuation test according to the embodiment of the present invention.

Figure 8A:
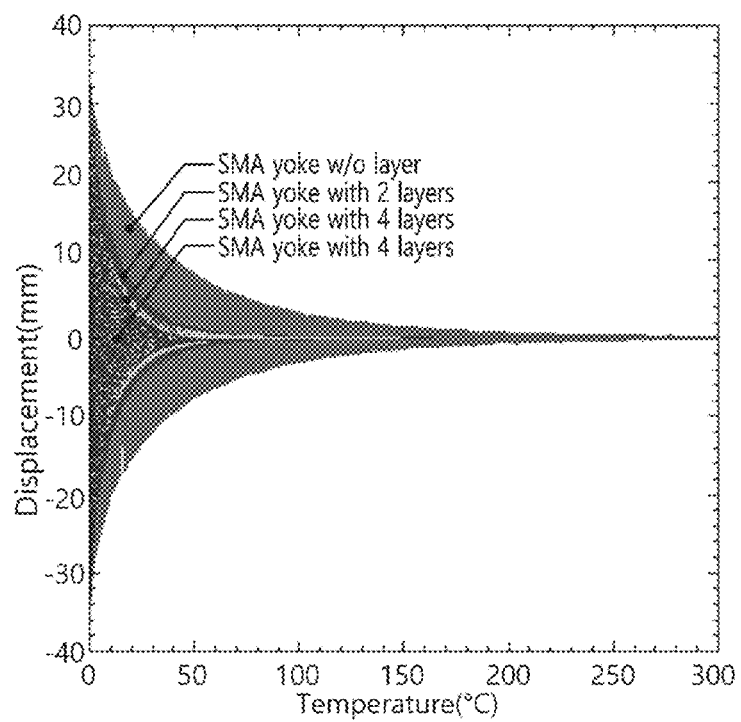
Figure 8B:
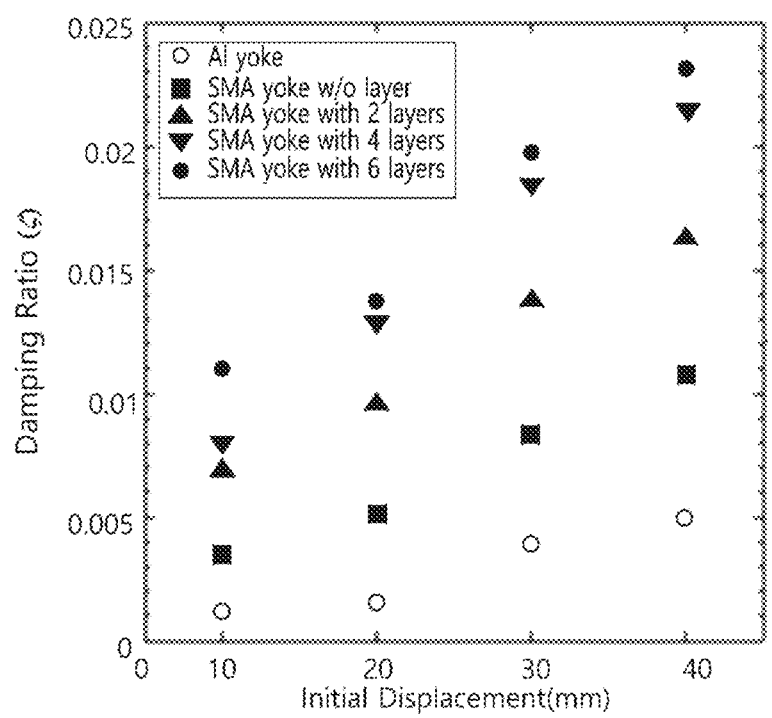

FIG. 8A is a view illustrating displacements with respect to time according to the embodiment of the present invention, and FIG. 8B is a view illustrating a damping ratio according to an initial displacement according to the embodiment of the present invention.

The free attenuation test has a condition of application of a displacement of 1 cm to 4 cm. Referring to FIG. 8, according to the result of the free attenuation test for the first yoke, the second yoke, and the third yoke, it can be seen that the damping performance is improved as the number of layers of the yoke made of the SMA increases in comparison with the yoke made of aluminum.

It can be seen that the damping ratio is further improved by about 4.6 times than the first yoke in a case in which the third yoke is applied under a condition of application of a displacement of 4 cm (6 layers are stacked).

Figure 9A:
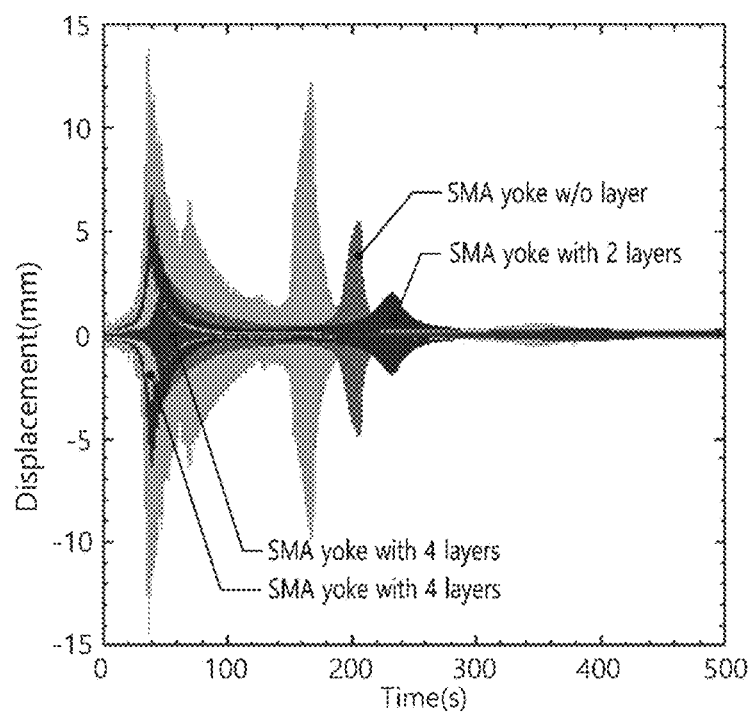
Figure 9B:
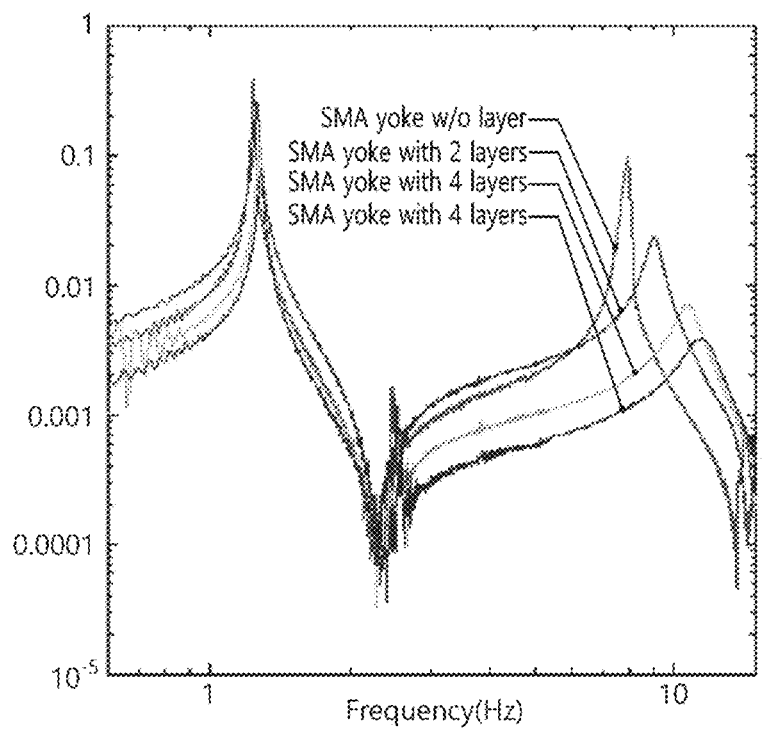
Figure 10:
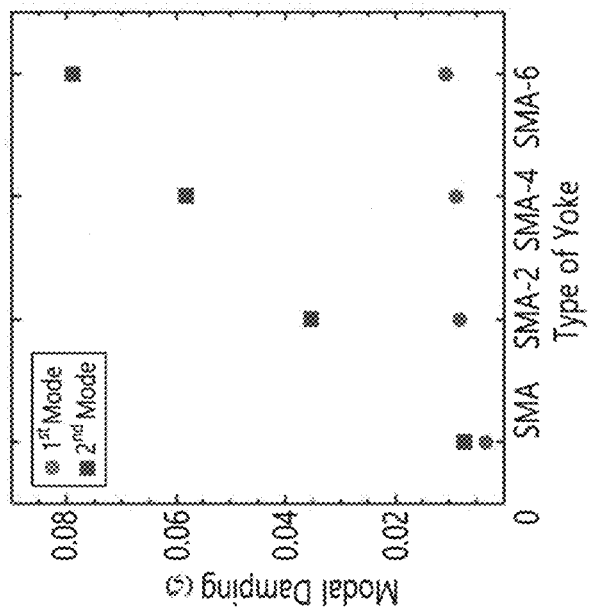
Figure 10:
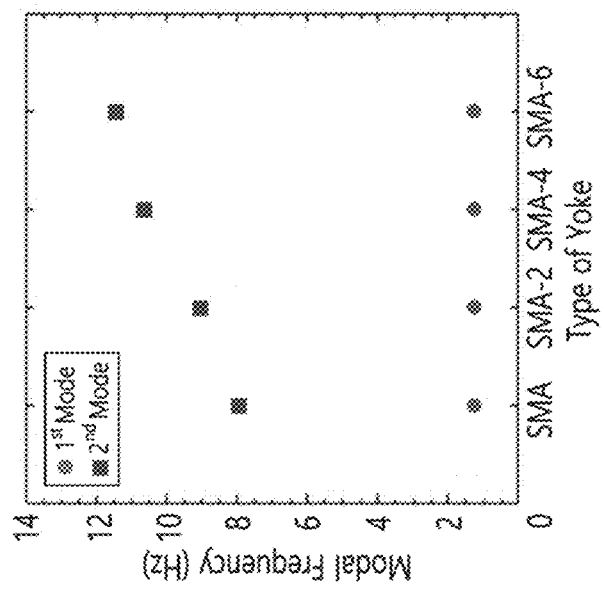

FIGS. 9 and 10 is a view illustrating a result of the sine sweep test according to the embodiment of the present invention.

The sine sweep test refers to a test performed by increasing or decreasing an excitation frequency according to a given amplitude in a particular frequency region.

The sine sweep test has a condition of application of a frequency of 1 Hz to 15 Hz.

FIG. 9 is a view illustrating a result of a first sine sweep test according to the embodiment of the present invention.

FIG. 9A is a view illustrating displacements with respect to time according to the embodiment of the present invention, and FIG. 9B is a view illustrating displacements with respect to frequencies according to the embodiment of the present invention.

Referring to FIG. 9, according to the first sine sweep test, it can be seen that the displacements are reduced in both the first and second modes as the number of layers of the third yoke increases in comparison with the second yoke.

In particular, in the case of the second mode, it can be seen that the displacement of the third yoke (with 6 layers stacked) is reduced by about 6.8 times in comparison with the second yoke (with 0 layer stacked).

FIG. 10 is a view illustrating a result of a second sine sweep test according to the embodiment of the present invention.

FIG. 10A is a view illustrating a modal frequency according to the type of yoke according to the embodiment of the present invention, and FIG. 10B is a view illustrating modal damping according to the type of yoke according to the embodiment of the present invention.

The modal means that the yoke follows a certain 'mode'.

Referring to FIG. 10, it can be seen that the value of the modal frequency and the value of the modal damping are improved as the number of layers increases.

In particular, in the case of the second mode, it can be seen that the value of the modal damping is improved by about 10 times in the third yoke (with 6 layers stacked) in comparison with the second yoke (with 0 layer stacked).

Figure 11:
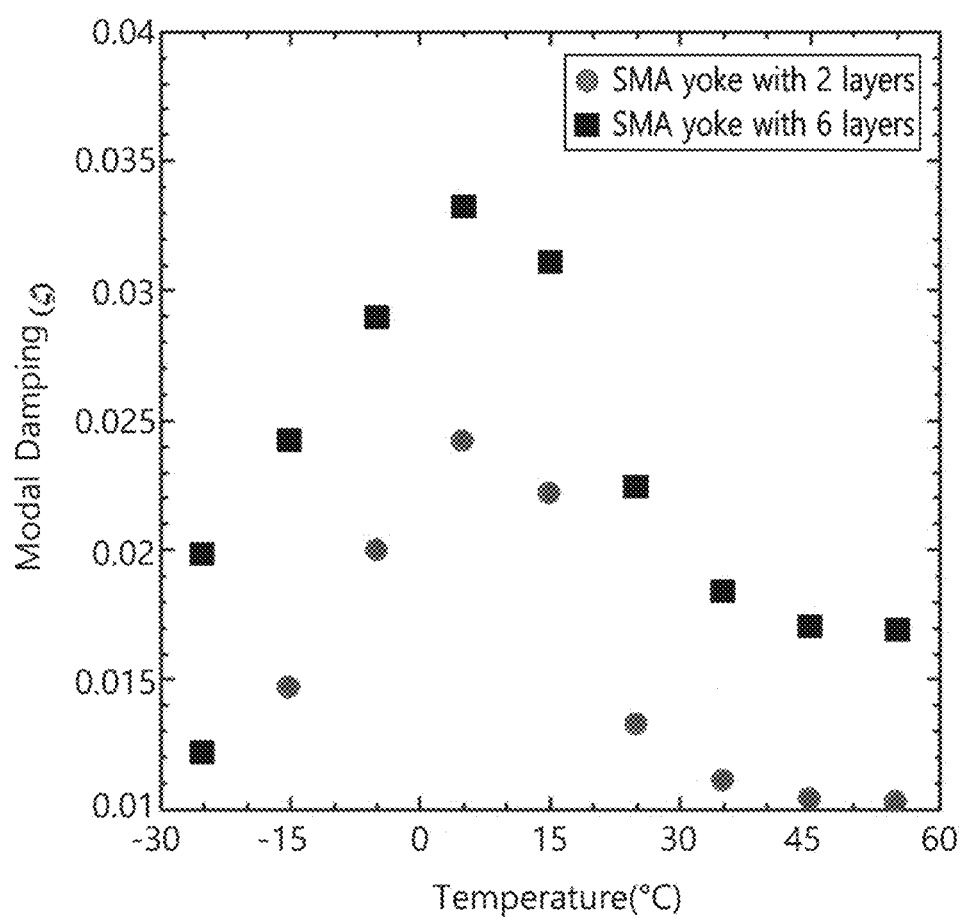

FIG. 11 is a view illustrating a result of the temperature test according to the embodiment of the present invention.

The temperature test has a temperature condition of −25° C. to 55° C. and a condition of application of a displacement of 4 cm.

Referring to FIG. 11, because of the properties of the viscoelastic material and the superelastic shape memory alloy (SMA), a change in properties according to the temperature is somewhat observed. However, the damping ratio of the 6-layered condition is about 1.6 times or more the damping ratio of the 2-layered condition at all test temperatures.

Therefore, it can be experimentally (in the free attenuation test, the sine sweep test, and the temperature test) proved that the superelastic SMA layered yoke structure according to the present invention is effective in vibration reducing performance in an elastic mode of the solar panel.

It can be seen that the high-damping properties of the deployable solar panel 10 are implemented under the same displacement condition in comparison with the yoke made of a general metallic material (Al). According to the result of the sine sweep test, excellent damping characteristics may be observed in the second mode of the solar panel. Further, it can be seen from the result of the temperature test that the higher damping performance is implemented in the same temperature range as the number of layers increases.

All the constituent elements, which constitute the embodiment of the present invention described above, may be integrally coupled or operate by being combined, but the present invention is not necessarily limited to the embodiment. That is, one or more of the constituent elements may be selectively combined and operated within the object of the present invention.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to de scribe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A deployable solar panel mounted on a movable body configured to be movable, the deployable solar panel comprising:
    a solar panel mounted on an outer portion of the movable body and configured to convert light energy into electrical energy;
    a yoke having a reinforcing part stacked on at least one surface of a base to connect the movable body and the solar panel and configured to attenuate vibration transmitted to the solar panel; and
    a connection portion connecting the yoke and the movable body, and a battery connection portion connecting the yoke and the solar panel;
    wherein the connection portion includes a first connection portion fixed to the movable body and a second connection portion assembled with the first connection portion and connected to the yoke;
    wherein the yoke includes a first yoke and a second yoke, each connected to both sides of the second connection portion, which is connected via the first connection portion at a position corresponding to that of a center of the solar panel;
    wherein the first yoke and second yoke are connected to opposite sides of the second connection portion and to both ends of the solar panel in a width direction, and the solar panel and second connection portion are assembled in a screw-fastened manner, forming a polygonal shape with an empty space inside;
    wherein the first connection portion is configured to rotate in a desired direction, allowing the yoke and solar panel to rotate in the desired direction based on the second connection portion for solar tracking.

2. The deployable solar panel of claim 1, wherein the yoke comprises:
    the base; and
    the reinforcing part configured to attenuate vibration inputted from the base and the outside, and the reinforcing part comprises:
    restriction layers stacked on two opposite surfaces of the base; and
    damping layers having viscoelasticity and configured to bond the restriction layers so that the restriction layers are stacked.

3. The deployable solar panel of claim 2, wherein the damping layers and the restriction layers of the reinforcing part are sequentially and alternately stacked on the two opposite surfaces of the base, and the same number of layers are alternately stacked on the two opposite surfaces of the base.

4. The deployable solar panel of claim 1,
    wherein the first and second yokes are symmetric with respect to the connection portion and the solar panel.

5. The deployable solar panel of claim 1, wherein the base is made of a superelastic shape memory alloy (SMA).

* * * * *